(12) United States Patent
Davis et al.

(10) Patent No.: US 9,676,094 B1
(45) Date of Patent: Jun. 13, 2017

(54) FLEXIBLE IMPLEMENT GRIP

(71) Applicant: Eaton Corporation, Cleveland, OH (US)

(72) Inventors: Stephen James Davis, Pinehurst, NC (US); Billy D. Wood, Whispering Pines, NC (US)

(73) Assignee: EATON CORPORATION, Cleveland, OH (US)

( * ) Notice: Subject to any disclaimer, the term of this patent is extended or adjusted under 35 U.S.C. 154(b) by 17 days.

(21) Appl. No.: 15/018,890

(22) Filed: Feb. 9, 2016

(51) Int. Cl.
| | | |
|---|---|---|
| *B25G 1/10* | (2006.01) | |
| *A63B 53/14* | (2015.01) | |
| *B29C 43/02* | (2006.01) | |
| *B29C 45/16* | (2006.01) | |
| *B29K 21/00* | (2006.01) | |
| *B29L 31/52* | (2006.01) | |

(52) U.S. Cl.
CPC .............. *B25G 1/102* (2013.01); *A63B 53/14* (2013.01); *B29C 43/027* (2013.01); *B29C 45/1671* (2013.01); *B29K 2021/00* (2013.01); *B29L 2031/5227* (2013.01)

(58) Field of Classification Search
CPC ........ B25G 1/10; B25G 1/102; B29C 43/027; B29C 45/1671; A63B 53/14; B62K 21/26; B62K 23/04
USPC .................................................. 16/421, 430
See application file for complete search history.

(56) References Cited

U.S. PATENT DOCUMENTS

| | | | | |
|---|---|---|---|---|
| 4,674,746 A * | 6/1987 | Benoit | ................... | A63B 60/24 |
| | | | | 30/308.1 |
| 4,822,052 A | 4/1989 | Dimmick et al. | | |
| 4,988,102 A | 1/1991 | Reisner | | |
| 6,413,167 B1 * | 7/2002 | Burke | ................ | A63B 69/3635 |
| | | | | 473/202 |
| 7,909,705 B2 | 3/2011 | Gill et al. | | |
| 8,294,066 B2 * | 10/2012 | Gill | ........................ | A63B 53/14 |
| | | | | 219/201 |
| 8,296,907 B2 * | 10/2012 | Gill | ........................ | B25G 1/102 |
| | | | | 16/421 |
| 8,540,591 B2 * | 9/2013 | Slane | ..................... | A63B 69/36 |
| | | | | 473/300 |
| 8,613,676 B2 * | 12/2013 | Bentley | .............. | A63B 21/4035 |
| | | | | 473/219 |

(Continued)

*Primary Examiner* — Roberta Delisle
(74) *Attorney, Agent, or Firm* — Fay Sharpe LLP

(57) ABSTRACT

A flexible tubular elastomeric grip for an implement to be manually swung with force and speed, such as a golf club is provided. A flexible tubular member molded of elastomeric material has an open end for receiving the club shaft with a hardness in the range of 38-55 on the Shore "A" scale and has a substantially closed end which has a greater hardness in the range of 65-100 on the Shore "A" scale. The closed end may be integrally molded with the tubular member or as one piece or formed pre-cured and adhesively received in the cavity after molding. An open cavity formed in the closed end has received therein an insert which may be a transducer, RFID tag, tracking device, speed/acceleration sensor or decorative item. In one version, a peripheral rim lip retains and secures the insert in the cavity. In another version, inwardly extending arms are formed integrally with the flexible tubular member to retain and secure the insert. Alternately, the arms may be connect to form a bridge over the cavity to retain and secure the insert.

30 Claims, 3 Drawing Sheets

(56) References Cited

U.S. PATENT DOCUMENTS

| | | | |
|---|---|---|---|
| 8,715,096 B2* | 5/2014 | Cherbini | G09B 19/0038 |
| | | | 473/131 |
| 8,870,673 B2 | 10/2014 | Beno et al. | |
| 9,227,118 B2 | 1/2016 | Beno et al. | |
| 2005/0261073 A1* | 11/2005 | Farrington, Jr. | A63B 69/3632 |
| | | | 473/221 |
| 2006/0205529 A1* | 9/2006 | Cera | A63B 49/08 |
| | | | 473/300 |
| 2010/0050390 A1* | 3/2010 | Wu | A63B 53/14 |
| | | | 16/421 |
| 2013/0203517 A1 | 8/2013 | Bolane et al. | |

\* cited by examiner

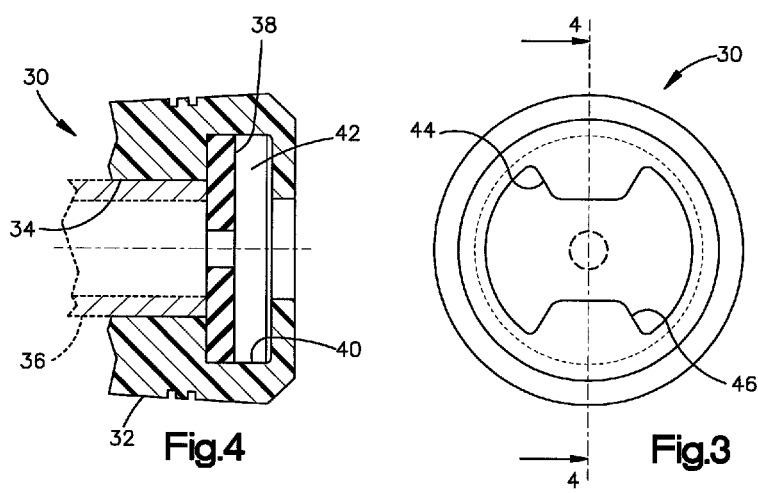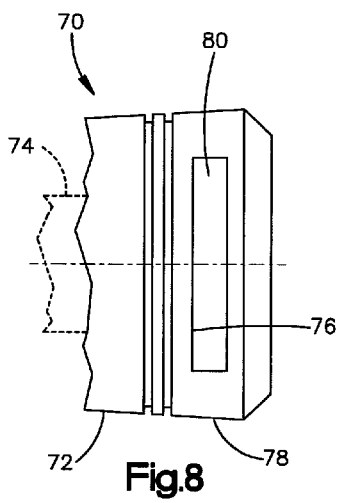

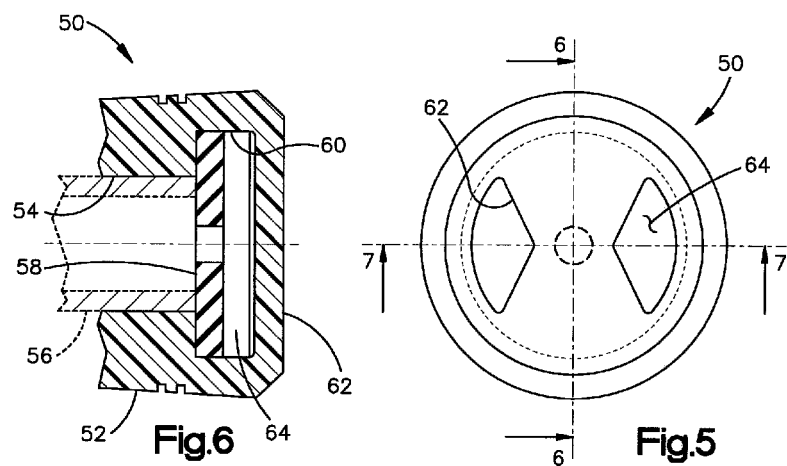
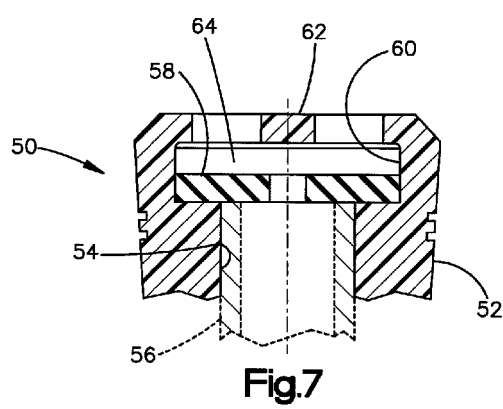

FLEXIBLE IMPLEMENT GRIP

BACKGROUND

The present disclosure relates to flexible implement grips of the type employed with implements to be manually moved with speed and force such as, for example, golf clubs, tennis racquets, or similar sport implements, or other types of implements such as, for example, hammers or axes.

Such implements have the grips typically formed of molded rubber or elastomer in tubular form with a substantially closed end and with the end opposite the closed end remaining open to receive therein the implement handle which may have a tubular configuration or be formed of solid material such as metal or wood. Typically, the flexible grip is formed of material having a relative hardness sufficiently low to facilitate gripping by the user during swinging.

In flexible grips used for golf clubs, it has been recently found desirable to employ a sensor in the substantially closed end of the grip to provide information on speed and acceleration of the implement during usage for purposes of improving the user's performance of the implement. With the advent of microelectronics, a sensor that is small enough to be disposed on a golf club grip and yet provide the desired sensing function has become available. It has also been desirable for marketing and aesthetic purposes to provide an insert in the end of the flexible grip and the insert may display a colored design or a logo.

Thus, it has been desired to provide a way or means of disposing a decorative insert or a sensor of the aforesaid type on the handle of an implement such as a flexible golf club grip and particularly such a grip that is injection or compression molded as a one piece member to be assembled over the implement handle.

BRIEF DESCRIPTION

The present disclosure describes a flexible grip for an implement to be swung with speed and force while manually gripped by a user and particularly a flexible golf club grip of the type which may be molded of elastomeric material as a unitary or one-piece member to be assembled over the shaft of the golf club. In one version, the flexible grip of the present disclosure has an open cavity received in the substantially closed end of the molded grip, with the cavity having an inwardly extending rim or peripheral lip for retaining an insert assembled into the open cavity.

In another version, the open cavity has at least one or a plurality of inwardly extending discrete portions or arms extending partially within the cavity for retaining the insert received in the cavity.

In another version, the inwardly extending discrete portions are connected thereby forming a bridge extending over a portion of the cavity for retaining an insert received therein.

In the present practice, it has been found satisfactory to form the substantially closed end portion and inwardly extending discrete portions for retaining the insert of an elastomeric material having a significantly greater hardness than the remaining portions of the flexible grip.

In the present practice, it has been found satisfactory to form the flexible tubular portion of the grip received over the implement handle of elastomeric material having a hardness in the range of 38-55 on the Shore "A" scale and the discrete portions extending over the cavity formed of elastomeric material having a hardness in the range of 65-100 on the Shore "A" scale.

In the present practice, it has also been found satisfactory to form the discrete portions extending inwardly over the open cavity to subtend a circumferential arc in the range of 30°-300° of arc.

In the present practice, the substantially closed end of the grip or floor of the cavity has an opening therein to facilitate escape of air during assembly onto the implement handle and to permit air circulation; and, the floor may also include another aperture or recess for receiving therein a portion of the insert for providing orientation of the insert.

In another version, the portion of the grip defining the open cavity has a void or aperture provided in the side wall thereof to permit exposure or viewing of the insert.

In one version of the flexible grip of the present disclosure, the substantially closed end is molded integrally as one piece with the tubular portion of the flexible grip; and, in another version, the substantially closed end is provided in the form of an uncured or pre-cured elastomeric insert disposed in the open cavity which insert is formed of the significantly harder material than the remainder of the flexible grip.

BRIEF DESCRIPTION OF THE DRAWINGS

FIG. 3 is an end view of another version of the flexible grip of the present disclosure;

FIG. 4 is a portion of a section view taken along section indicating lines 4-4 of FIG. 3;

FIG. 5 is a view similar to FIG. 1 of another version of the flexible grip of the present disclosure;

FIG. 6 is a portion of a section view taken along section indicating lines 6-6 of FIG. 5;

FIG. 7 is a portion of a section view taken along section indicating lines 7-7 of FIG. 5; and FIG. 8 is a portion of a side view of another version of the flexible grip of the present disclosure.

DETAILED DESCRIPTION

Figure 1:
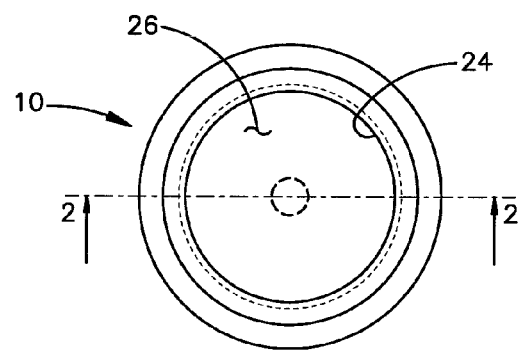
FIG. 1 is an end view of the flexible grip of the present disclosure.
Figure 2:
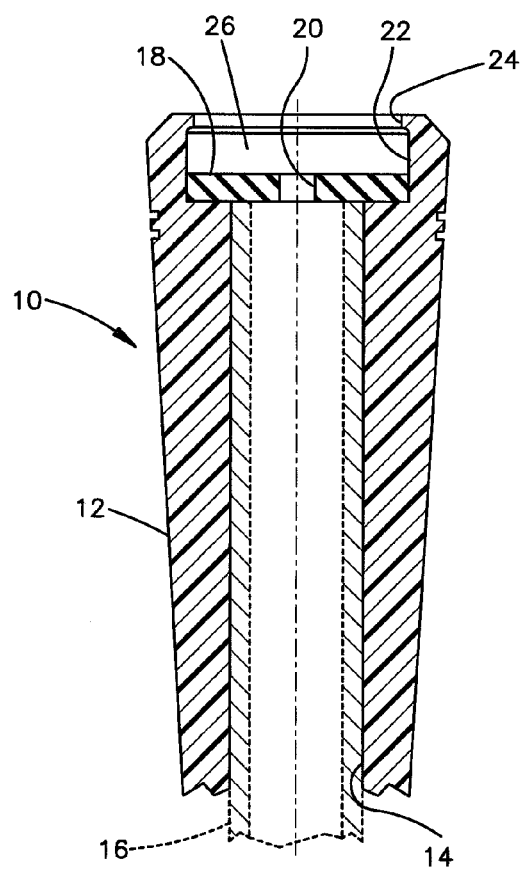
FIG. 2 is a section view taken along section indicating lines 2-2 of FIG. 1.

With reference to FIGS. 1 and 2, one version of the flexible grip assembly of the present disclosure is indicated generally at 10 and has an elongated tubular portion 12 formed of elastomeric or rubber material and has an end open to the hollow interior 14 which is adapted to have received therein a handle 16, indicated in dashed line, of an implement to be swung with speed and force, which in the illustrated version of FIGS. 1 and 2 comprises a tubular shaft for a golf club. The grip 12 has the end opposite the open end which is formed substantially closed by a transverse member 18 having an aperture 20 provided therein for facilitating assembly of the grip 12 onto the shaft 16 and permitting air to flow or circulate therethrough. The member 18 may be formed of elastomeric material having a hardness significantly greater than that of the tubular member 12; and, in the present practice, it has been found satisfactory to form the tubular member 12 of material having a hardness in the range of 38-55 on the Shore "A" scale; and, the transverse member 18 may be formed of material having a hardness in the range of 65-100 on the Shore "A" scale.

The transverse member 18 may be formed integrally as one-piece with the tubular member 12 by inserting uncured material for member 18 in a mold along with the material for the tubular member 12 and injection or compression molded simultaneously. Alternatively, the transverse member 18 may be formed of partially cured elastomer material; and, the member 18 inserted into an open cavity 22 formed in the end of the tubular member 12 and the member 18 subsequently molded with the material of the tubular member 12. Alternately, the transverse member 18 may be fully pre-cured elastomer or formed of plastic and adhesively secured in the cavity 22 after molding of the flexible grip 12.

The cavity 22 has the periphery of the open end thereof extending inwardly to form a rim or lip 24 about the periphery of the opening. The cavity 22 has an insert 26 which may comprise one of a sensor, RFID tag, tracking device, transducer, or decorative item 26 received therein and is retained therein by the peripheral lip 24. If desired, the lip 24 may be formed of elastomeric material having a hardness significantly greater than that of the tubular member 12. In the present practice, it has been found satisfactory to form the lip of elastomer having a hardness in the range of 65-100 on the Shore "A" scale. The sensor may be of the type sensing speed and acceleration or an RFID tag or tracking device. The insert 26 may include colored indicia, a logo, embossing, graphics, or be light emitting, or include translucent, refractive, or reflective material.

Referring to FIGS. 3 and 4, another version of the flexible grip assembly of the present disclosure is indicated generally at 30 and has an elongated tubular portion 32 an open end 34 received over an implement handle such as the tubular handle or shaft of a golf club indicated in dashed lines at 36. The end opposite open end 34 is substantially closed by a transverse member 38 which forms the floor of an open cavity 40 formed in the end of the tubular member 32. The cavity 40 may have received therein an insert 42 which may be an electronic sensor, tracking device, transducer, RFID tags, or decorative item 42, which insert 42 is retained in the cavity by at least one or a plurality of discrete portions 44, 46 extending inwardly of the periphery of the cavity 40, which portions extend only partially across the cavity 40. In the present practice, the discrete portions 44, 46 may also be formed of elastomeric or rubber material having a hardness significantly greater than that of the tubular portion 32. In the present practice, it has been found satisfactory to have the discrete portions formed of material having a hardness in the range of 65-100 on the Shore "A" scale. The discrete portions 44, 46 in the aggregate extend circumferentially by an amount in the range of 30°-300° of central arc. The discrete portions 44, 46 may be formed of a different color than the tubular portion 32. The insert 42 may include a medallion having colored indicia, a logo, graphics, or embossing thereon.

With reference to FIGS. 5, 6, and 7, another version of the flexible grip of the present disclosure is indicated generally at 50 and has a tubular portion 52 formed of elastomeric or rubber material with the inner periphery having an open end 54 adapted to have received therein the end of an implement handle such as the tubular shaft of a golf club indicated in dashed line at 56. The end opposite the open end 54 is substantially closed by a transverse member 58 which is formed of material having a hardness significantly greater than that of the tubular member 52 in a manner similar to the embodiment of FIG. 1. The transverse member 58 forms the floor of an open cavity 60 in the end of the grip opposite end 54. The version of FIGS. 5, 6, and 7 has a bridge 62 which may be formed by extending end connecting inwardly extending discrete portions with the bridge 62 extending over the insert 64 received in cavity 60 for retaining the insert in the cavity 60. In the present practice, it has been found satisfactory to form the bridge 62 of material having a hardness significantly greater than that of the tubular portion 52. In the present practice, it has been found satisfactory to have the bridge 62 forming a cover in the range of 30°-300° central arc of the periphery of the cavity 60. The bridge, in the versions shown in FIGS. 5, 6, and 7, is formed by two discrete arms connecting in the center forming two openings; however, it will be understood that more than two arms may be employed. In the present practice, the bridge may comprise arms extending arcuately in the range of 10°-90° or in the range of 1 mm-7 mm in width. The arms may have parallel or tapered sides. Alternately, 3-5 spaced arms may be employed for the bridge 62 connecting in the center and defining an associated number of openings. The insert may comprise one of a sensor, transducer, tracking device, RFID tag, or a decorative item and may include a medallion having colored indicia, a logo, graphics, or embossing. The decorative item may be a medallion, a light emitting device, and may include translucent, reflective or refractive material.

Referring to FIG. 8, another version of the flexible grip assembly of the present disclosure is indicated generally at 70 and has a tubular portion 72 formed of elastomeric or rubber material having an open end received over an end of an implement handle such as a golf club shaft shown in dashed line at 74. The opposite end of the grip member 72 has a substantially closed end with a cavity having an insert 80 received therein which may be retained by any of the techniques of the above-described versions. The insert 80 may comprise a transducer, RFID tag, tracking device, sensor or a decorative item such as a medallion. The version 70 has portions of the insert 80 exposed by a slot or opening 76 formed in the side wall of the sensor cavity to expose portions of the insert 80 for viewing by the user. The opening may thus expose decorative colored indicia, graphics, embossing, or a logo provided on the insert 80 if desired for marketability. The opening 76 may be molded in the grip or formed after molding. In the versions shown in FIGS. 5, 6, and 7, the insert 64 may be molded in place or, alternatively, the bridge stretched and the insert snapped in place. Alternately, the insert may be installed from the open end of the tubular portion prior to installation of the transverse member 58.

The present disclosure thus describes a flexible grip for an implement to be swung manually with speed and force such as a golf club wherein the grip has a tubular portion with an open end adapted to have the end of the implement handle received therein such as the tubular shaft of a golf club. The open end of the grip has the opposite end substantially closed by a transverse member, which is formed of material of significantly greater hardness; and, the transverse member provides a floor to an open cavity provided in the end of the grip. An insert such as a sensor or medallion is received in the open cavity and in one version is retained by peripheral lip, and another version is retained by discrete portions extending radially inwardly and in another version is retained by extending and connecting the discrete portions to form a bridge extending over the open cavity. The peripheral lip, discrete portions extending inwardly and the bridge may also be formed of material of hardness significantly greater than that of the tubular portion received over the implement handle. The flexible grip assembly of the present disclosure thus provides a capability of incorporating an insert comprising one of a decorative medallion or a speed and acceleration sensor in the grip for providing the added capability of analyzing the performance of the user or colored indicia, a logo, graphics, or embossing for marketability or aesthetics.

The exemplary versions have been described with reference to the drawings. Obviously, modifications and alterations will occur to others upon reading and understanding the preceding detailed description. It is intended that the exemplary versions be construed as including all such modifications and alterations insofar as they come within the scope of the appended claims or the equivalents thereof.

The invention claimed is:

1. A grip assembly for an implement to be manually moved with speed and force comprising:
   (a) a flexible tubular member having an open end operative for receiving therein an implement handle and a substantially closed end distal the open end;
   (b) an open cavity formed in the substantially closed end, the cavity having a peripheral rim with at least one discrete flexible portion thereof extending inwardly therefrom over a portion of the cavity; and
   (c) an insert comprising one of a sensor operative to sense one of speed and acceleration and a decorative item disposed in the open cavity, wherein the at least one discrete flexible portion extends over a portion of the insert thereby retaining the insert in the open cavity.

2. The grip assembly of claim 1, wherein the open end is configured for receiving therein a tubular golf club handle.

3. The grip assembly of claim 1, wherein the at least one discrete flexible portion comprises a plurality of peripherally spaced arms.

4. The grip assembly of claim 1, wherein the closed end includes a transverse member formed of one of elastomeric material and plastic material having a hardness significantly greater than the tubular member wherein the transverse member forms a floor of the open cavity and the at least one discrete flexible portion is formed integrally with the flexible tubular member.

5. The grip assembly of claim 1, wherein the at least one discrete flexible portion includes a plurality of discrete flexible portions connected to form a bridge extending over a portion of the open cavity.

6. The grip assembly of claim 1, wherein the at least one discrete flexible portion extends inwardly from the rim and circumferentially an amount in the range of 30°-300° of arc.

7. The grip assembly of claim 1, wherein the open cavity has a floor that has one of a recess and an opening therein adapted for receiving portions of the insert therein for orienting the insert on the grip.

8. The grip assembly of claim 1, wherein the open cavity has a side wall with an aperture therein for exposing to view portions of the sensor.

9. The grip assembly of claim 1, wherein the insert includes one of a transducer, RFID tag, tracking device, sensor, or decorative item.

10. The grip assembly of claim 1, wherein the at least one discrete portion includes one of (a) a peripheral lip, (b) a pair of spaced arms, and (c) a bridge for retaining the insert.

11. The grip assembly of claim 1, wherein the at least one discrete flexible portion of the peripheral rim is formed of material of a different color than the tubular member.

12. The grip assembly of claim 1, wherein the at least one discrete flexible portion is formed integrally as one piece with the flexible tubular member.

13. The grip assembly of claim 12, wherein the flexible tubular member is formed of elastomeric material having a hardness in the range of 38-55 on the Shore "A" scale and the at least one discrete flexible portion has a hardness in the range of 65-100 on the Shore "A" scale.

14. The grip assembly of claim 1, wherein the at least one discrete flexible portion comprises a pair of arms, each extending arcuately in the range of 10°-90°.

15. A flexible grip for a handle of an implement to be manually moved with speed and force comprising:
   (a) a flexible tubular member having an open end adapted for receiving the handle therein and a substantially closed end; and
   (b) an open cavity formed in the substantially closed end, the cavity having a peripheral rim with at least one discrete flexible portion thereof extending inwardly therefrom over a portion of the cavity, wherein the flexible tubular member and the at least one discrete flexible portion are formed integrally as a one piece member with the at least one discrete flexible portion formed of elastomeric material having a hardness significantly greater than the hardness of the tubular member, wherein the open cavity is adapted for receiving an insert therein.

16. The flexible grip of claim 15, wherein the at least one discrete flexible portion comprises a plurality of peripherally spaced arms.

17. The flexible grip of claim 15, wherein the at least one discrete flexible portion extends to form a bridge over a portion of the open cavity.

18. The flexible grip of claim 15, wherein the flexible tubular member has a hardness in the range of 38-55 on the Shore "A" scale and the at least one flexible discrete portion has a hardness in the range of 65-100 on the Shore "A" scale.

19. The flexible grip of claim 15, wherein the at least one discrete flexible portion extends radially inwardly from the peripheral rim and circumferentially an amount in the range of 30°-300° of arc.

20. The flexible grip of claim 15, wherein an insert is disposed in the open cavity, the insert comprising one of a decorative medallion and a sensor operative to sense one of speed and acceleration wherein the at least one flexible portion extends over a portion of the insert thereby retaining the insert in the open cavity.

21. The flexible grip of claim 20, wherein the open cavity has a floor with one of a recess and an opening therein for engaging portions of the insert for orienting the insert in the open cavity.

22. The flexible grip of claim 15, wherein the substantially closed end includes a transverse member formed of elastomeric material having a hardness in the range of 65-100 on the Shore "A" scale.

23. The flexible grip of claim 22, wherein the transverse member is molded integrally as one piece with the flexible tubular member.

24. The flexible grip of claim 22, wherein the transverse member is formed of fully pre-cured elastomeric material and is adhesively secured in the flexible tubular member.

25. The flexible grip of claim 22, wherein the transverse member is formed of plastic material and is adhesively secured in the flexible tubular member.

26. The flexible grip of claim 15, wherein the flexible tubular member has a hardness in the range of 38-55 on the Shore "A" scale.

27. The flexible grip of claim 15, wherein the at least one discrete portion comprises a pair of spaced arms extending arcuately in the range of 10°-90°.

28. A method of making a flexible grip for a handle of an implement to be manually moved with speed and force comprising:

forming as one piece:
(a) a tubular member of elastomeric material having an open end adapted for receiving the handle therein and a substantially closed end; and
(b) an open cavity formed in the closed end, the cavity having a peripheral rim with at least one discrete flexible portion thereof extending inwardly therefrom over a portion of the cavity and forming the at least one discrete flexible portion of elastomeric material having a hardness significantly greater than the hardness of the tubular member, with the open cavity adapted for receiving an insert therein.

29. The method of claim 28, wherein forming as one piece comprises molding by one of compression molding and injection molding.

30. The method of claim 28, wherein forming a tubular member comprises forming with a hardness in the range of 38-55 on the Shore "A" scale and forming at least one flexible discrete portion includes forming with a hardness in the range of 65-100 on the Shore "A" scale.

\* \* \* \* \*